United States Patent [19]
Panigati

[11] 3,895,815
[45] July 22, 1975

[54] SEALING ASSEMBLY
[75] Inventor: Pier Luigi Panigati, Lugano, Switzerland
[73] Assignee: Etablissements d'Occident, Vaduz, Liechtenstein
[22] Filed: Feb. 4, 1974
[21] Appl. No.: 439,433

[30] Foreign Application Priority Data
Feb. 9, 1973 Switzerland.......................... 1884/73

[52] U.S. Cl. ........ 277/171; 137/517; 251/DIG. 001
[51] Int. Cl.² ...................... F16J 15/32; F16J 15/40
[58] Field of Search............ 137/517; 251/DIG. 001; 277/169–172

[56] References Cited
UNITED STATES PATENTS
3,347,555  10/1967  Norton.............................. 277/171

Primary Examiner—Robert I. Smith

[57] ABSTRACT

An assembly comprising first and second relatively movable coaxial cylindrical bodies, such as for use in a double acting piston and cylinder arrangement, the two bodies having opposed first and second cylindrical surfaces respectively. The assembly includes a sealing device having a V-shaped annular chamber with diverging flanks opening into the first cylindrical surface with a tip being formed at the junction of these flanks. A sealing ring of substantially triangular cross-section, is located in the annular chamber and its two diverging side walls diverge at a smaller angle of divergence than the flanks of the annular chamber, so that the sealing ring is tiltable from a rest position about the tip of the annular chamber, and a third wall of the sealing ring is positioned in opposed facing relationship to the second cylindrical surface, and is preferably slightly spaced therefrom, the third wall sealingly contacting the second cylindrical surface only in a tilted position of the sealing ring.

5 Claims, 4 Drawing Figures

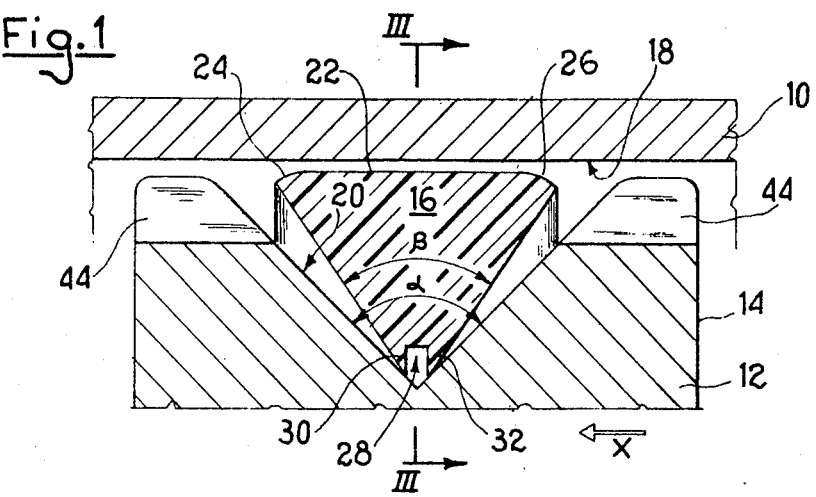
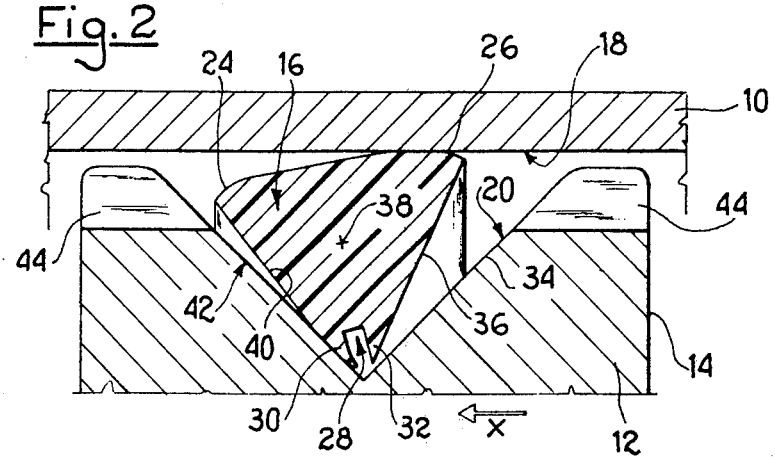
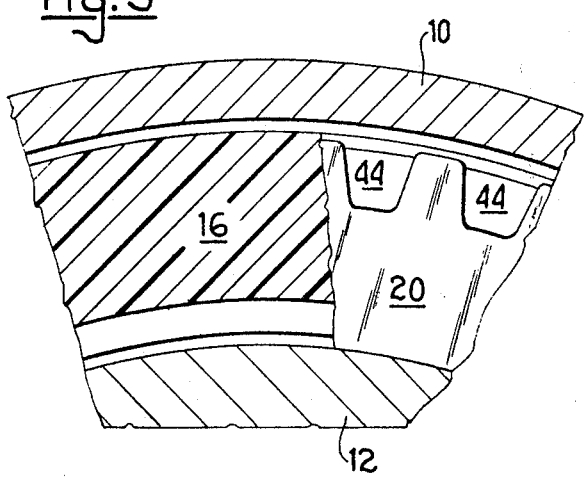

SEALING ASSEMBLY

The invention relates to a sealing assembly.

Sealing devices utilised in pneumatic or hydraulic cylinders and generally called sealing rings of O-ring or U-ring construction are known. The geometric and operational characteristics are also known and, therefore, need not be repeated herein. It should only be mentioned that sealing devices of the O-ring type must have a comparatively large modulus of elasticity in order to ensure a reliable sealing effect. The difference between the largest diameter of the sealing ring in normal position and the diameter of the surface against which the ring must seal is comparatively great. This gives rise to a comparatively strong friction between the sealing ring and the surface contacted by the latter. This applies both to the normal state and to the state of movement, and requires a comparatively elevated pressure for initiating the movement as well as a comparatively heavy wear of the sealing device.

The sealing device of the O- or U-rings type partly avoids the above mentioned disadvantages. Nevertheless, with double-acting pistons and cylinder arrangements, the comparatively large lip which is not used for sealing detrimentally affects the surface against which the seal is to act, by wiping off any film of oil which may there be present and thus leading to scratches resulting from small raised portions of the surface.

One particular known form of seal for sealing between two coaxial cylindrical bodies, comprises a sealing ring and an annular chamber in one of the two bodies for receiving the sealing ring, the chamber being of V-shaped cross-section and the sealing ring being of substantially triangular cross-section and having sides which converge toward the base of the chamber, whereby the sealing ring is tiltable about said base for the purpose of performing a sealing action. However, prior to the two bodies being assembled this sealing ring has a larger diameter than that of the body in the annular chamber in which the ring is disposed. The intention is that after assembling, the ring should be compressed by the internal surface of the second body, so that one entire side of the triangle should contact this internal surface under pressure. However, the strong friction mentioned above between the sealing ring and the internal surface and the disadvantages connected therewith again result from this arrangement. Moreover, this sealing surface extends rectilinearly so that sharp edges are formed at the transition to the two converging flanks, which edges have the same detrimental effect on the film of oil or on the surface as had the above mentioned lip.

According to the present invention, we provide an assembly comprising first and second relatively movable coaxial cylindrical bodies having opposed first and second cylindrical surfaces respectively, a sealing device including diverging flanks defining a V-shaped annular chamber, opening into said first cylindrical surface, a sealing ring of substantially triangular cross-section located in said annular chamber and having two sidewalls diverging at an angle less than the angle of divergence of the flanks of the annular chamber, so that the sealing ring is tiltable from a rest position about the tip of said annular chamber, formed at the junction of the flanks thereof, and a third wall of said sealing ring in opposed facing relationship to said second cylindrical surface, the third wall sealingly contacting said second cylindrical surface only in a tilted position of the sealing ring.

Preferably the axial end portions of said third wall are each convexly arcuately curved towards the adjacent side wall.

In order that the invention will more readily be understood, the following description is given, merely by way of example, reference being made to the accompanying drawing, in which:

FIG. 1 is a longitudinal cross-section through part of one embodiment of assembly according to the invention in an "at rest" position;

FIG. 2 is a longitudinal cross-section, analogous to that of FIG. 1, through the sealing ring in operating position;

FIG. 3 is a section taken along the line III—III of FIG. 1, drawn partly with and partly without the sealing ring; and FIG. 4 is a longitudinal section, similar to FIGS. 1 and 2, showing a different embodiment of assembly according to the invention.

In FIGS. 1 to 3 there are shown a cylinder 10 and a piston 12, illustrated in longitudinal section along a plane passing through the common axis of piston and cylinder. The cylinder 10 and piston 12 are subjected to a relative movement, usually by movement of the piston. A pressure is exerted on one side of the piston 12, for example on the side 14, so as to effect a displacement of the piston 12 in the direction of the arrow X, as is shown in FIGS. 1 and 2.

In order to ensure satisfactory working it is necessary for the pressure medium which pressurizes the side 14 of the piston 12 not to pass to the opposite side of the piston 12. By means of the sealing device, including a sealing ring 16 contacting the polished surface 18 of the cylinder 10 and an annular chamber 20 receiving the sealing ring 16 in the piston 12, it is possible to obtain a sealing effect.

As is shown in FIG. 1 the sealing ring 16 is substantially triangular in cross-section, one side 22 of which triangle extends parallel to the surface 18 against which sealing is to be effected.

The cross-section of the sealing ring, is such that the side 22 has axial end portions which are convexly arcuately curved towards the side walls 36 and 40 of the sealing ring to form rounded off portions at the two apices 24 and 26. The apex which is situated opposite the side 22 has a groove 28 with lips 30 and 32 formed on either side thereof, the lips being of such dimensions that they provide a zone which is more resilient than the remainder of the sealing ring 16.

The sealing ring 16 is located in the annular chamber 20 which, as is shown in the drawing, has a cross-section comprised of a polygon having convergent flanks arranged in the shape of a V. The angle α is larger than the angle β in the apex of the polygon opposite the side 22. In this manner the angle of divergence of the flanks 34 and 42 is longer than that of the side walls 36 and 40 of the sealing ring 16, relative to the same points of a cross-section through the sealing ring. The lips 30 and 32 of the sealing ring 16 engage the bottom of the annular chamber 20. In the basic or at rest position of the sealing ring, as shown in FIG. 1, the sealing ring 16 does not contact the surface 18 against which it is to perform its sealing function at all or at most at a few scattered positions by very small tolerances between piston side 14 and surface 18. It must lie on the base of the annular chamber 20 without pressure, otherwise it would be drawn against one or the other of the flanks 34, 42.

FIG. 2 shows the sealing ring 16 in its working position, i.e. with pressure medium present on the side 14 of the piston 12. This pressure medium enters into the gap between the flank 34 of the annular chamber 20 and side wall 36 of the sealing ring 16 and produces a force which generates an angular momentum in the sealing ring 16. This angular momentum moves the sealing ring 16 up to a point where the side wall 40 of the sealing ring 16 contacts the flank 42 of the piston 12. The pressure medium is now capable of exerting a force on the piston 12, via the side walls 36, 40 and flank 42. Initially the twisting of the sealing ring proceeds rigidly and subsequently with resilient deformation thereof, so that a clearance, which is proportional to the pressure used, is established between the piston 12 and the sealing ring 16. As can be seen in FIG. 2, twisting of the sealing ring 16 causes the rounded off portion 26 to expand at that side where the pressure medium flows in. Simultaneously the lip 30 resiliently contacts the flank 42 whereby a good seal is obtained. The pressure medium, which also penetrates into the groove 28, urges the lip 30 against the flank 42.

FIGS. 1 to 3 show recesses 44 in the piston 12, to assist in the admission of the pressure medium to the sealing ring 16 and between the flank 34 and side wall 36. These recesses 44 are distributed around the whole periphery of the piston or the annular chamber 20.

The embodiment according to FIGS. 1 and 2 relates to a double-acting pressure cylinder. For this reason the triangular cross-sections of the sealing ring and of the annular chamber are isosceles triangles, so that the two side walls face the same length and the two flanks have the same length. This sealing device is of symmetrical design with respect to the angle bisector of the tip of the annular chamber. In contrast thereto, FIG. 4 shows an embodiment wherein the sealing device need only perform its function toward one side. In this case the cross-section of the sealing ring may be right-angled or stepped. The reference numerals 10', 12', 16' and 20' designate the same elements as those designated by the same numerals without the primes in FIGS. 1 to 3.

It need not be emphasized that the sealing device of FIGS. 1 to 4 can perform its function regardless of whether the seal proper, i.e. the sealing ring, is inserted into the cylinder or into the piston.

The above described sealing device has the following advantages, which may also be present separately, over known sealing devices:

The frictional forces caused by the thrust on the surface 18 are reduced to a minimum. The sealing device does not contact the wall of the cylinder when in the at rest position, and the diameter of the wall of the cylinder can be a few tenths of a millimetre greater than the diameter of the sealing ring and a pressure of a few hundredths of an atmosphere is sufficient to bring the sealing ring into contact and thus to make the seal operative.

By virtue of the fact that the sealing device permits the film of oil to pass readily over the surface of the sealing ring, uniformity of piston movement is ensured.

Moreover, the sealing device easily glides over uneven portions of the surface and thus produces an extraordinary evenness of the piston movement. This evenness is also caused by the design of the surface 22 of the sealing ring relative to the polished surface 18 of the cylinder 10, which facilitates the movement of the piston in either direction.

A further advantage of the present invention resides in the reduction of abrasion, and thus of reduced wear. When the surface of the sealing ring has become worn at its original line of contact, then the sealing ring automatically enlarges the angle of its tilt from the at rest position and thus ensures contact of the sealing ring and the cylinder surface along a new line of contact. In this manner worn particles cannot be deposited on the contact surface.

When the sealing ring is worn at the piston side, then the contact surface of the sealing ring undergoes a change as the piston reciprocates. A greatly increased useful life of the sealing ring results in this manner. The sealing ring also differs from the known designs by its simplicity of construction and operation. By virtue of the present invention it is possible to produce, at low cost, a sealing device, the behaviour of which can also be calculated theoretically by means of simple formulae. Furthermore, it is possible to so construct the annular chamber that it can fully meet the sealing requirements.

I claim:

1. In an assembly comprising first and second relatively movable coaxial cylindrical bodies having opposed first and second cylindrical surfaces respectively, a sealing device comprising diverging flanks defining a V-shaped annular chamber, opening into said first cylindrical surface, a tip of said annular chamber formed at the junction of said flanks, a sealing ring of substantially triangular cross-section located in said annular chamber, two diverging sidewalls of said sealing ring diverging at an angle less than the angle of divergence of the flanks of the annular chamber, whereby the sealing ring is tiltable from a rest position about said tip of said annular chamber, and a third wall of said sealing ring in opposed facing relationship to said second cylindrical surface, said third wall being spaced from said second cylindrical surface in said rest position of said sealing ring and sealingly contacting said second cylindrical surface only in a tilted position of said sealing ring.

2. A sealing device as claimed in claim 1, and further comprising axial end portions of said third wall each of said portions being convexly arcuately curved towards the adjacent side wall.

3. A sealing device as claimed in claim 1, wherein the sealing ring has at least one resiliently deformable zone situated in the vicinity of the junction of said two diverging side walls opposite said third wall, and located in the tip of said annular chamber.

4. A sealing device as claimed in claim 3, wherein said resiliently deformable zone comprises means defining a groove at the junction of said side walls, and extending towards said third wall, and forming lips with said side walls.

5. A sealing device as claimed in claim 1, and further comprising means defining recesses in said first member extending around the periphery of the annular chamber, effective to provide access for pressure medium to the space defined between the sealing ring side walls and the adjacent flanks.

* * * * *